6871X
O. WILLIS.
Ore Washer.
Patented Dec. 21, 1831.
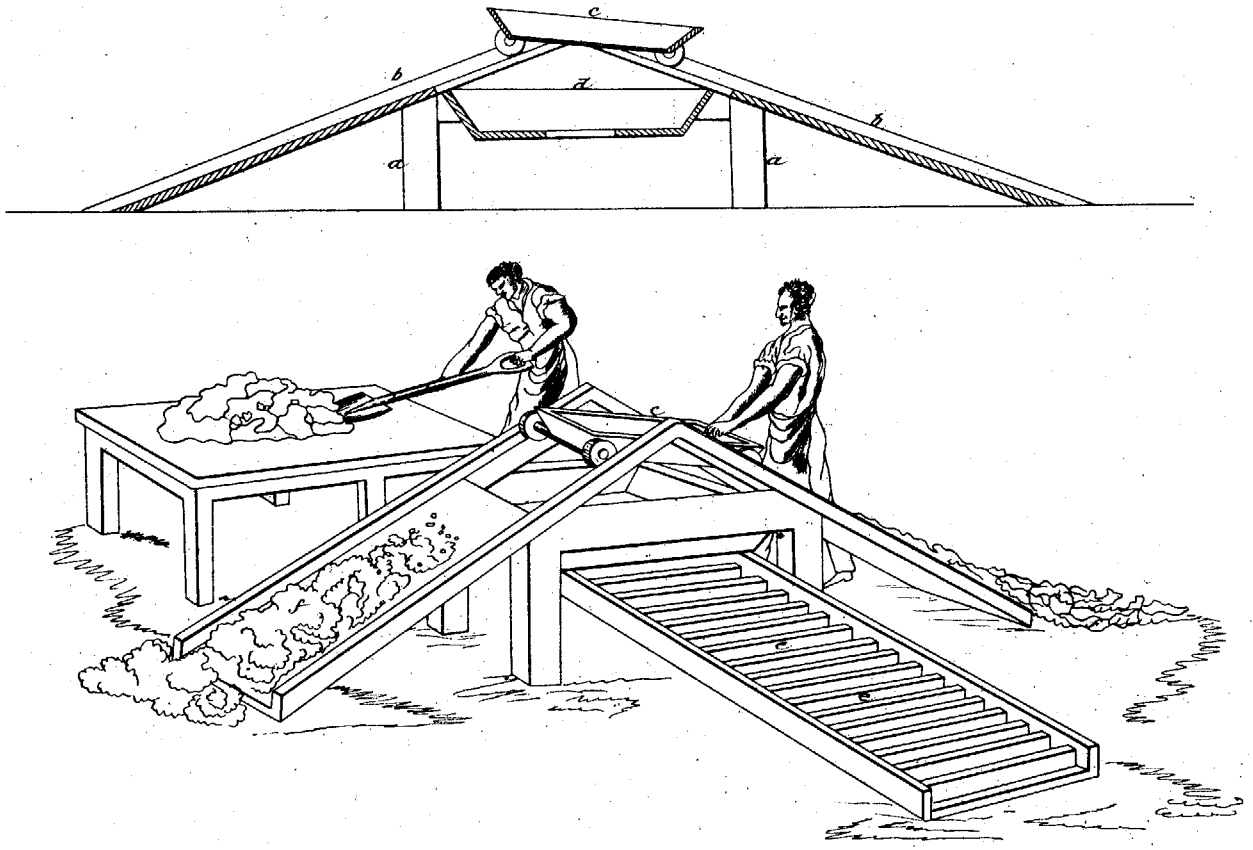
THE NORRIS PETERS CO., PHOTO-LITHO., WASHINGTON, D. C.

Dec 21. 1831 59

6871X

Oscar Willis
Letters Patent

The Schedule referred to in these Letters Patent and making part of the same containing a description in the words of the said Oscar Willis himself of his improvement in machinery for washing Gold called "The Rail way Car Gold Riddle"

---

To all to whom these Presents shall come

Be it known that I Oscar Willis, of the County of Burke and State of North Carolina have invented a new and useful Machine or improvement in gold washing machinery and applicable to any sifting process whatever particularly that of earthy substances which machine he calls the Rail way Car Gold Riddle and that the following is a full and exact description of the construction and operation of the said machine as invented by me. to wit. A frame is made of timber of any convenient size, four feet eight inches in length and two feet eight inches wide with four posts two feet six inches high. An inclined plane inclining each way from the centre is attached to each side of the frame with an angle of twenty one degrees with the base upon which the wheels of the car ascend and descend alternately. The Car and Riddle are formed by a box made of plank two feet wide three feet six inches long and eight inches deep with an inclination at each end of forty five degrees and a bottom of sheet iron perforated with holes. The riddle moves upon the inclined planes by means of small wooden or cast wheels either upon axles upon which the riddle rests or directly attached to the sides of the box or riddle. The inclinations at each end of the riddle are for the purpose of throwing out the gravel when washed. Within the frame is a hopper fitting it ten inches deep, with an aperture eight inches square and resting upon the beams of the frame as high as the bottom of the inclined planes. Directly under the aperture of the hopper the end of a ripple is placed with an inclination more or less as circumstances may require, thirty inches wide ten feet long and six inches deep with

[illegible]

6891X with the ripples three inches deep and six inches apart. The machine is used in the following manner. When the grit or gravel is thrown from a table or platform into the riddle a man placed at the end of the frame gives motion to the riddle by pushing it forwards compelling the wheels next to him to ascend the inclined planes and those farthest from him to descend upon the other side and vice versa, whereby a peculiar motion is given to the gravel and is thus speedily washed by being thrown on in the usual manner. My claim in this invention is entire with the exception of the ripple Oscar Willis Exd Witnesses
[illegible] B. S. Gaither
James H. Tate

[494 [illegible]]